UNITED STATES PATENT OFFICE 2,238,231

CYANINE DYESTUFFS

Oskar Riester, Dessau-Ziebigk, and Gustav Wilmanns, Wolfen, Germany, assignors, by mesne assignments, to General Aniline & Film Corporation, New York, N. Y., a corporation of Delaware No Drawing. Application March 2, 1939, Serial No. 259,392. In Germany March 8, 1938

3 Claims. (Cl. 260—240)

Our present invention relates to the production of new cyanine dyestuffs.

It is known practice to convert heterocyclic bases having a reactive methyl group, for example 2-methylbenzthiazole and 2-methylbenzoxazole, into quaternary ammonium salts with the aid of alkyl halides and to condense the salts thus obtained to form cyanine dyestuffs of all kinds. These dyestuffs belong to the class of basic dyestuffs and have all the normal dyeing properties of this class. In consequence of their basic character they are not suitable for all purposes; moreover they are only slightly fast to light.

This invention has for an object to provide a process of producing cyanine dyestuffs which comprises condensing an ω-halogen-fatty acid with a heterocyclic nitrogen base into the quaternary ammonium salt serving as raw material for the dyestuff.

Another object of our invention is the provision of the new acid cyanine dyestuffs.

Further objects of the invention will be apparent from the description following hereinafter.

To produce the new quaternary salts from the heterocyclic nitrogen bases, for example 2-methylbenzthiazole, the latter are condensed with an ω-halogen-fatty acid, for example iodopropionic acid, in almost the same way as the alkyl halide salts of these bases have been produced by alkyl halides. There is, however, the advantage that the reaction occurs at atmospheric pressure, so that no inconvenient raised pressure is necessary as in the case of alkylation. The reaction proceeds for example in the following manner:

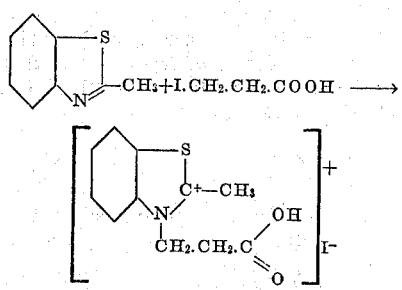

In place of the 2-methylbenzthiazole any heterocyclic base known and used for the synthesis of cyanine dyestuffs can be employed, for example oxazoles, selenazoles, thiazolines, selenazolines, benzimidazoles, indolines, quinolines, thiodiazoles and the like in so far as they contain a reactive methyl group. Naturally the bases can contain substituents known in cyanine dyestuff chemistry, for example alkyl, alkoxy, amino-groups, alkylamino-groups, aryl, phenylene, naphthylene and the like.

It is surprising that these bodies can be condensed in a manner known per se to form methine dyestuffs having an acid character, namely for example ready solubility in organic or inorganic bases, since these condensation reactions have hitherto always led to basic dyestuffs.

For producing the symmetrical and unsymmetrical trimethinecyanines, isocyanines, pseudocyanines and the like the processes known for producing the corresponding basic cyanine dyestuffs can be used. Thus, for example, there can be produced with the aid of the known ortho-fatty acid-ester synthesis (for example ortho-formic, ortho-acetic and ortho-propionic acid esters) trimethine cyanines which, depending on the ester used, are substituted or unsubstituted in the meso-position. Similarly for example pentamethine cyanines can be produced by known processes if the condensation is carried out with trimethine dianilide and piperidine. Polymethine dyestuffs with yet longer chains can be produced by methods described in the relevant literature. The pseudocyanines are produced from monomethine dyestuffs, for example by the process described in British Patent No. 423,792. The isocyanines are produced by known processes, for example by condensing quinoline with a halogen-fatty acid and then further condensing the product, for example with sodium alcoholate and the addition product of a halogen-fatty acid and a 2-alkyl-heterocyclic base, for example 2-methylbenzthiazole.

The new dyestuffs have the remarkable property that after being dyed on wool, cotton and the like they can be treated with a salt of a heavy metal, for example chrome alum, whereby their resistance to light is quite substantially increased as compared with that of the cyanines hitherto known. The tones of the dyeings obtained are slightly deeper than those of the basic dyestuffs which contain only alkyl.

The invention is illustrated by the following examples:

*Example 1.*—From the condensation product of 1.1.2-trimethylindolin and β-iodopropionic acid there is produced by condensation with ortho-formic acid ester in pyridine an intense red dyestuff having an absorption maximum in methanol at about 547 mμ. his dyestuff of the following formula

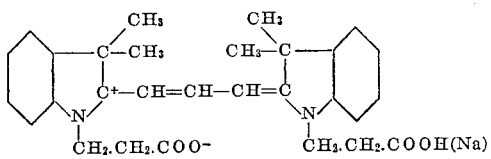

dyes wool in weakly acid baths in bright red tones. The dyeing can be after-chromed and has then somewhat more violet tone.

*Example 2.*—1 mol of 2-methylthiazoline is warmed for ½ hour at 130° C. with 1 mol of chloropropionic acid and the sticky mass is condensed with 3 mols of pyridine and 1 mol of ortho-formic acid ester for 1 hour at 110° C. The trimethine of the following formula

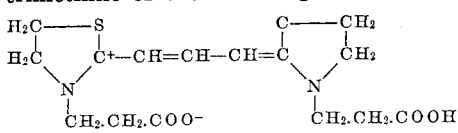

is produced in the form of yellow needles which dissolve in water to a solution having a clear yellow color.

*Example 3.*—The condensation product of 2-methyl-β-naphthothiazole (from β-napthylamine) and bromacetic acid is condensed with ortho-formic acid ester for 2 hours in boiling pyridine. Dark colored needles are precipitated which dissolve in water containing a little caustic soda to a blue-violet solution with an absorption maximum at about 590 mμ. The dyestuffs has the following formula

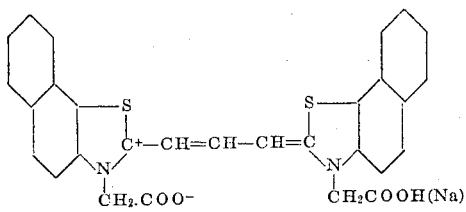

The dyeing on wool has a pure blue color.

*Example 4.*—The condensation product from 1 mol of 2-methylbenzthiazole and 1 mol of β-iodopropionic acid is condensed with ½ mol of trimethinedianilide hydrochloride with the addition of 1 mol of piperidine for ½ an hour on the water bath. The pentamethine dyestuff produced of the following formula

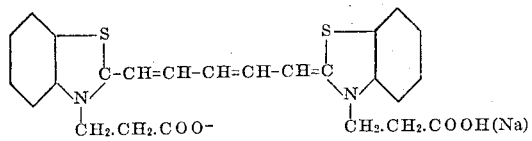

is pure green with an absorption maximum at 655 mμ and dyes silk pure green tones.

*Example 5.*—1 mol of 2-methyl-6-methoxybenzoxazole is warmed with 1 mol of iodopropionic acid for 10 minutes at 170° C. The viscous mass obtained is condensed with 3 mols of diphenyl formamidine and 1 mol of acetic anhydride for ½ hour at 120° C. An intermediate product of the following formula is obtained:

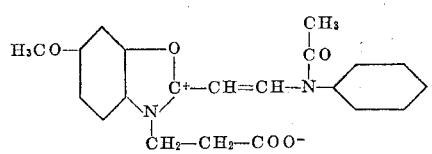

This yellow product is condensed in boiling pyridine with 1 mol of the condensation product of 2-methyl-benzselenazole and 1 mol of iodopropionic acid for 1 hour. The whole is poured into water and the dyestuff is precipitated by the addition of somewhat diluted acetic acid; it can be recrystallized from methanol. The dyestuff of the following formula:

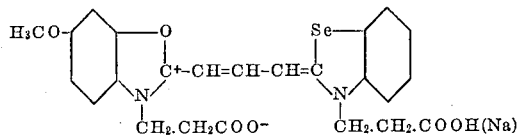

dissolves to an orange-red solution in water to which a few drops of piperidine have been added.

Absorption maximum: 530 mμ.

*Example 6.*—1 mol of 2-methyl-β.β'-naphthoxazole and 1 mol of β-bromopropionic acid are condensed for 1 hour at 150° in the oil bath. The propionate obtained is further condensed with pyridine and 2 mols of S-ethyl-iso-thiopropionic acid anilide for 5 hours at 110° C., whereby a dyestuff is produced which has the following formula:

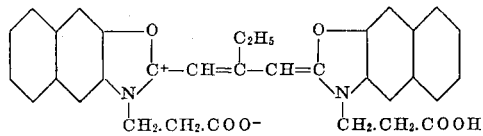

Absorption maximum: 503 mβ.

*Example 7.*—1 mol of 2-meththiobenzthiazole and 1 mol of β-iodopropionic acid are heated together for 20 minutes at 140° C. The liquid is then boiled for 1 hour in 10 mols of pyridine with the condensation product of 1 mol of 2-methyl-β-naphthothiazole and 1 mol of bromacetic acid (produced by heating for ½ hour at 130° C.). A yellow dyestuff of the following formula crystalizes on cooling:

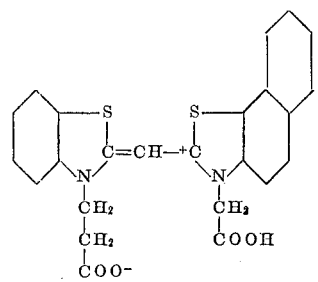

Absorption maximum: 440 mμ.

*Example 8.*—The condensation product from 2 mols of quinaldine and bromacetic acid is boiled for ½ hour in a mixture of pyridine and methanol with 1 mol of iodoform and 3 mols of sodium ethylate. A blue dyestuff of the following formula crystallizes:

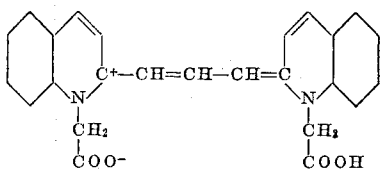

Absorption maximum: 605 mμ

*Example 9.*—The condensation product from 2-methylbenzthiazole and β-iodopropionic acid is heated for 3 hours at 100° C. with ethylortho-acetate in pyridine. A dyestuff of the following formula is obtained:

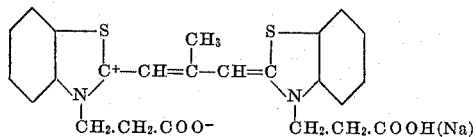

Absorption maximum: 560 mμ.

*Example 10.*—A solution of 2-methyl-benzthiazole bromoacetate and 2-methothiobenzthiazole β-bromopropionate in pyridine is boiled for ½ hour. A dyestuff of the following formula is produced:

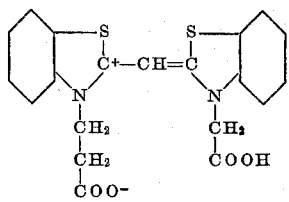

Absorption maximum: about 420 mμ.

The dyestuffs are also especially suitable for the sensitization of photographic emulsions and their use in this relationship is protected by companion application Serial No. 259,393, entitled Photographic emulsion, filed on March 2, 1939.

We claim:

1. A cyanine dyestuff comprising two heterocyclic nitrogenous rings of the type used in the production of cyanine dyes linked together by a methenyl chain, each of said rings containing a fatty acid radicle united in ω-position to the carboxyl-group of said radicle to the nitrogen atom of the heterocyclic ring.

2. A cyanine dyestuff comprising two heterocyclic nitrogenous rings of the type used in the production of cyanine dyes linked together by a methenyl chain, each of said rings containing a fatty acid radicle united in ω-position to the carboxyl-group of said radicle to the nitrogen atom of the heterocyclic ring, said two fatty acid radicles being identical.

3. A cyanine dyestuff comprising two heterocyclic nitrogenous rings of the type used in the production of cyanine dyes linked together by a methenyl chain, each of said rings containing a fatty acid radicle united in ω-position to the carboxyl-group of said radicle to the nitrogen atom of the heterocyclic ring, said two fatty acid radicles being dissimilar.

OSKAR RIESTER.
GUSTAV WILMANNS.